US010896355B2

(12) United States Patent
Farfade et al.

(10) Patent No.: US 10,896,355 B2
(45) Date of Patent: Jan. 19, 2021

(54) AUTOMATIC CANONICAL DIGITAL IMAGE SELECTION METHOD AND APPARATUS

(71) Applicant: VERIZON MEDIA INC., New York, NY (US)

(72) Inventors: Sachin Sudhakar Farfade, Santa Clara, CA (US); Vijay Mahadevan, Santa Clara, CA (US); Ayman Kaheel, Denver, CO (US); Ayyappan Arasu, Cupertino, CA (US); Venkat Kumar Reddy Barakam, Cupertino, CA (US); Jay Kiran Mahadeokar, Santa Clara, CA (US)

(73) Assignee: VERIZON MEDIA INC., New York, NY (US)

( * ) Notice: Subject to any disclaimer, the term of this patent is extended or adjusted under 35 U.S.C. 154(b) by 68 days.

(21) Appl. No.: 16/228,834

(22) Filed: Dec. 21, 2018

(65) Prior Publication Data

US 2019/0147301 A1    May 16, 2019

Related U.S. Application Data

(63) Continuation of application No. 15/198,295, filed on Jun. 30, 2016, now Pat. No. 10,163,041.

(51) Int. Cl.
    *G06K 9/62* (2006.01)
    *G06F 16/583* (2019.01)
    *G06K 9/00* (2006.01)

(52) U.S. Cl.
    CPC ....... *G06K 9/6297* (2013.01); *G06F 16/5854* (2019.01); *G06K 9/00281* (2013.01); *G06K 9/6224* (2013.01); *G06K 9/6247* (2013.01); *G06K 9/00228* (2013.01)

(58) Field of Classification Search
    CPC .......... G06F 16/58–787; G06F 17/787; G06K 9/00268–00281; G06K 9/6218–9/6226; G06K 16/55
    See application file for complete search history.

(56) References Cited

U.S. PATENT DOCUMENTS

| 8,489,589 | B2 | 7/2013 | Mei et al. | |
|---|---|---|---|---|
| 2010/0303342 | A1* | 12/2010 | Berg | G06F 16/583 382/155 |
| 2014/0363075 | A1* | 12/2014 | Li | G06F 16/5838 382/159 |
| 2015/0169978 | A1* | 6/2015 | Pillai | G06K 9/622 382/195 |
| 2015/0269191 | A1* | 9/2015 | Duan | G06F 16/5838 382/305 |
| 2017/0323178 | A1 | 11/2017 | Kwatra et al. | |

* cited by examiner

*Primary Examiner* — Brian Werner
(74) *Attorney, Agent, or Firm* — James J. DeCarlo; Greenberg Traurig, LLP

(57) ABSTRACT

Disclosed are systems and methods for automatic selection of canonical digital images from a large corpus of digital images, such as the corpus of digital images available on the web, for an entity, such as and without limitation a person, a point of interest, object, etc. The automated, unsupervised approach for selecting a diverse set of high quality, canonical digital images, is well suited for processing a large corpus of digital images. A set of canonical digital images identified for an entity can be retrieved in response to a digital image request for digital images depicting the entity.

20 Claims, 7 Drawing Sheets

AUTOMATIC CANONICAL DIGITAL IMAGE SELECTION METHOD AND APPARATUS

CROSS REFERENCE TO RELATED APPLICATIONS

This application is a continuation of and claims priority from co-pending U.S. patent application Ser. No. 15/198,295, filed Jun. 30, 2016, entitled AUTOMATIC CANONICAL DIGITAL IMAGE SELECTION METHOD AND APPARATUS, the contents of which is hereby incorporated by reference.

FIELD OF THE DISCLOSURE

The present disclosure relates to selecting one or more canonical digital images from a set of digital images that depict an entity, such as a person.

BACKGROUND

There are a significant number of digital images available via a computing device to a user. Currently, digital image searching retrieves an image based on metadata associated with image and a query. By way of one example, a digital image search might retrieve a number of digital images having a metadata term that is the same or similar to a search query term. This approach returns a number of digital images that vary in quality and that may not depict the subject matter, e.g., a person, which is of interest to the user. The approach requires considerable time and effort on the part of the user, since the approach requires that the user open each digital image returned as part of the search results until the user finds a digital image that is contains the content for which the user entered the query.

SUMMARY

The present disclosure provides novel systems and methods for automatic selection of high quality, canonical digital images from a large corpus of digital images, such as the corpus of digital images available on the web. Embodiments of the present disclosure provide an automated, unsupervised approach for selecting a diverse set of high quality, canonical digital images, which is well suited for a large corpus of digital images. In contrast to a supervised approach which requires labeled training data (e.g., tagging of hundreds of thousands of digital images), the unsupervised approach used with embodiments of the present disclosure does not use labeled training data, which makes it easily scalable to a very large number of digital images, including the corpus of digital images available over an electronics communication network such as the Internet, the web, etc., and a large number of entities. Embodiments of the present disclosure use an unsupervised approach to identify a set of high quality, canonical digital images for each entity, e.g., each person, point of interest, object etc., using any number (e.g., a small digital image library to the corpus of digital images available via the web) of unlabeled digital images. The set of canonical digital images identified for an entity can be retrieved in response to a digital image request, which may include a query, for digital images depicting the entity.

Presently, digital image retrieval relies on the metadata associated with each digital image to retrieve a set of search results. The metadata associated with a digital image may be inaccurate or ambiguous, which can easily lead to retrieval of digital images that do not depict the requested entity. In addition and even in a case that the metadata is accurate and/or unambiguous, a digital image may not be an optimal (e.g., definitive, canonical, most representative, low quality) depiction of the entity.

The automatic selection of canonical digital images from a large corpus of digital images described herein enables the efficiency of processing of any size corpus of digital images and automatic selection, from the corpus of digital images, of a number of digital images that are most representative of an entity. This presents improvements in the speed of retrieval and distribution of high quality, representative digital images.

According to some embodiments, the disclosed systems and methods first searches for digital images using a number of text-based searches, selects a set of candidate digital images based on relevance to the search query(s), analyzes pixel data of each candidate digital image to generate a feature vector representation of each candidate digital image, a clustering approach is used to form clusters, or groups, of candidate digital images, smaller clusters can be eliminated from further consideration, and a number of digital images is selected from each of a number of the clusters. In selecting a number of images from a cluster, each image in the cluster is given a score representing a quality of the image's depiction of the entity. In generating a score for a candidate digital image, a number of aspects of the candidate digital image are considered. Some examples of considerations that can be used to measure quality include a determined proportion of the candidate digital image depicting the entity, a determination whether or not the candidate digital image is a natural image (versus a sketch, cartoon, etc.), a determination of the aesthetics of the candidate digital image, such as that the candidate digital image is not offensive content. Within a given cluster, the score associated with each candidate digital image can be used to rank, or order, the candidate digital images. A number of the highest scoring candidate digital images can then be selected from each of the larger clusters. The selected candidate digital images from a given cluster represent the canonical digital images from the cluster. By clustering the candidate digital images based on feature vector similarity and then selecting a number of digital images from multiple clusters, and groupings within a cluster, a diverse set of canonical digital images can be determined for a given entity.

It will be recognized from the disclosure herein that embodiments of the instant disclosure provide improvements to a number of technology areas, for example those related to systems and processes that handle or process content retrieval and delivery to users over the internet, such as but not limited to, search engines, digital content sharing web services, or other types of media retrieval platforms, recommendation platforms, electronic social networking platforms and the like.

The disclosed systems and methods can effectuate increased efficiency and accuracy in the ways that users can retrieve and access digital image content, thereby minimizing user effort, as the disclosed systems and methods, inter alia, reduce the amount of required effort for a user to search for, and retrieve, digital image content depicting a given entity. Users benefit from the fully automated selection of canonical digital images of an entity provided by the disclosed systems and methods. For example, the disclosed automated selection of canonical digital images "sifts through" a large corpus of digital images and automatically selects a number of canonical digital images of an entity for the user, so that such canonical digital images can be speedily presented to the user in response to a retrieval request. This avoids the users having to view low-quality digital images of an entity, which reduces a user's frustration thereby increasing the user's satisfaction with a digital content provider's system. In addition, a digital content system is improved and made more efficient, given that the number of digital images that are retrieved and/or transmitted over an electronic communications network to a client device can be optimized.

In accordance with one or more embodiments, a method is disclosed which includes receiving, at a computing device, a request for a set of canonical digital images of an entity; generating, via the computing device, a number of digital image search result sets, the search result set generation comprising querying a number of digital image data stores using a number of queries, each query comprising a number of search terms; selecting, via the computing device, a plurality of candidate digital images from the number of digital image search result sets, the plurality of candidate digital images being selected using a relevancy score associated with each candidate digital image of the plurality; analyzing, via the computing device, each candidate digital image to detect an object of a type corresponding to the entity; determining, via the computing device, an n-dimensional feature vector for a candidate digital image of the plurality using data of pixels corresponding to the object detected in the candidate digital image, the feature vector determination being performed for each candidate digital image of the plurality to determine a plurality of feature vectors; forming, via the computing device, a plurality of clusters using the plurality of feature vectors, each cluster of the plurality comprising a number of feature vectors, each feature vector in each cluster corresponding to a candidate digital image of the plurality; and selecting, via the computing device, a set of candidate digital images for the set of canonical digital images using a number of clusters of the plurality, the candidate digital image selection comprising determining, for each candidate digital image with a corresponding feature vector belonging to a cluster of the number of clusters, a measure of quality based on at least one consideration of quality, each candidate digital image of the set of candidate digital images having a higher measure of quality relative to the measure of quality associated with each unselected candidate digital image.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for automatically high quality, canonical digital images for an entity.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DRAWINGS

The above-mentioned features and objects of the present disclosure will become more apparent with reference to the following description taken in conjunction with the accompanying drawings wherein like reference numerals denote like elements and in which.

Figure 4A:
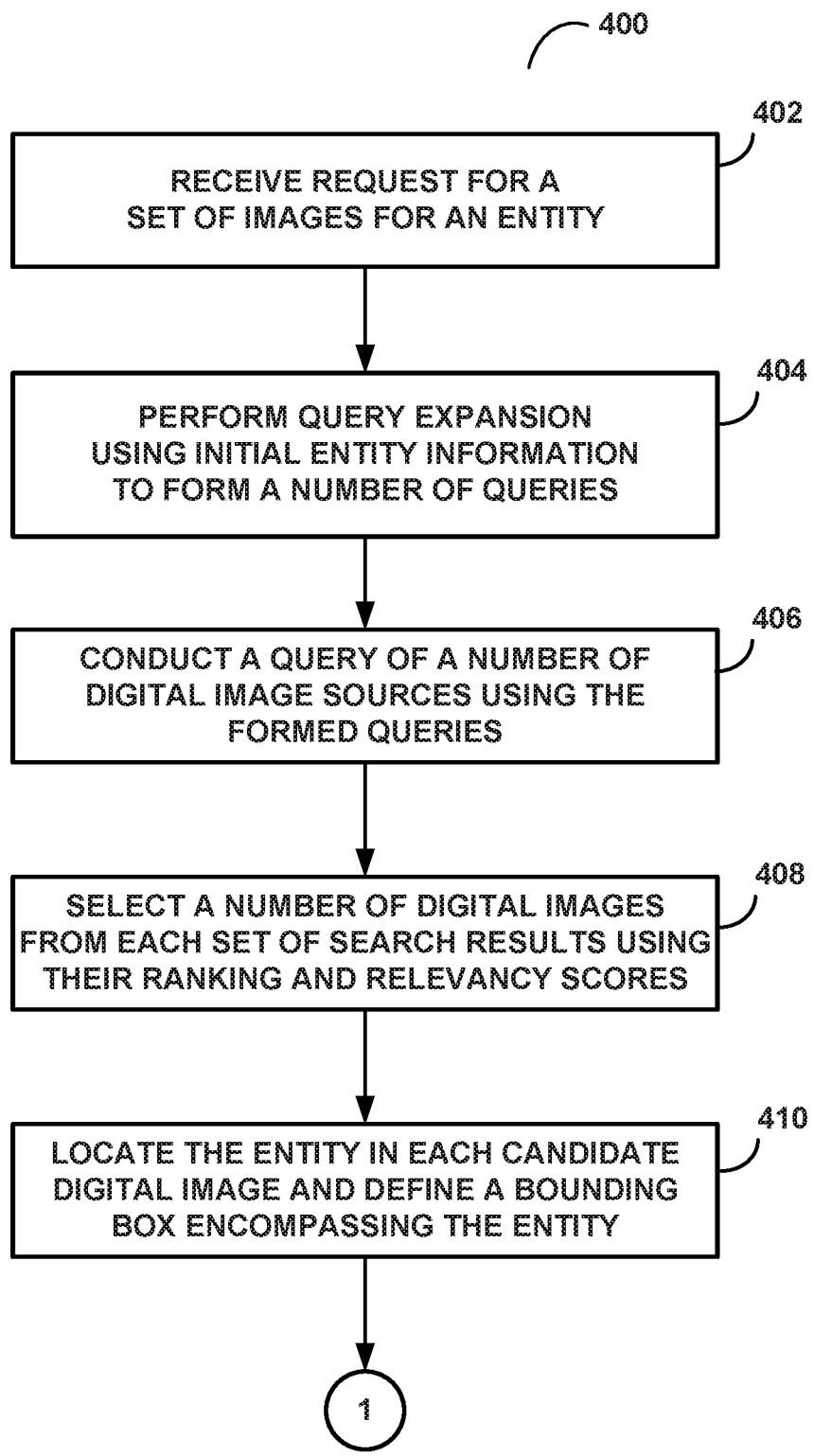
Figure 4B:
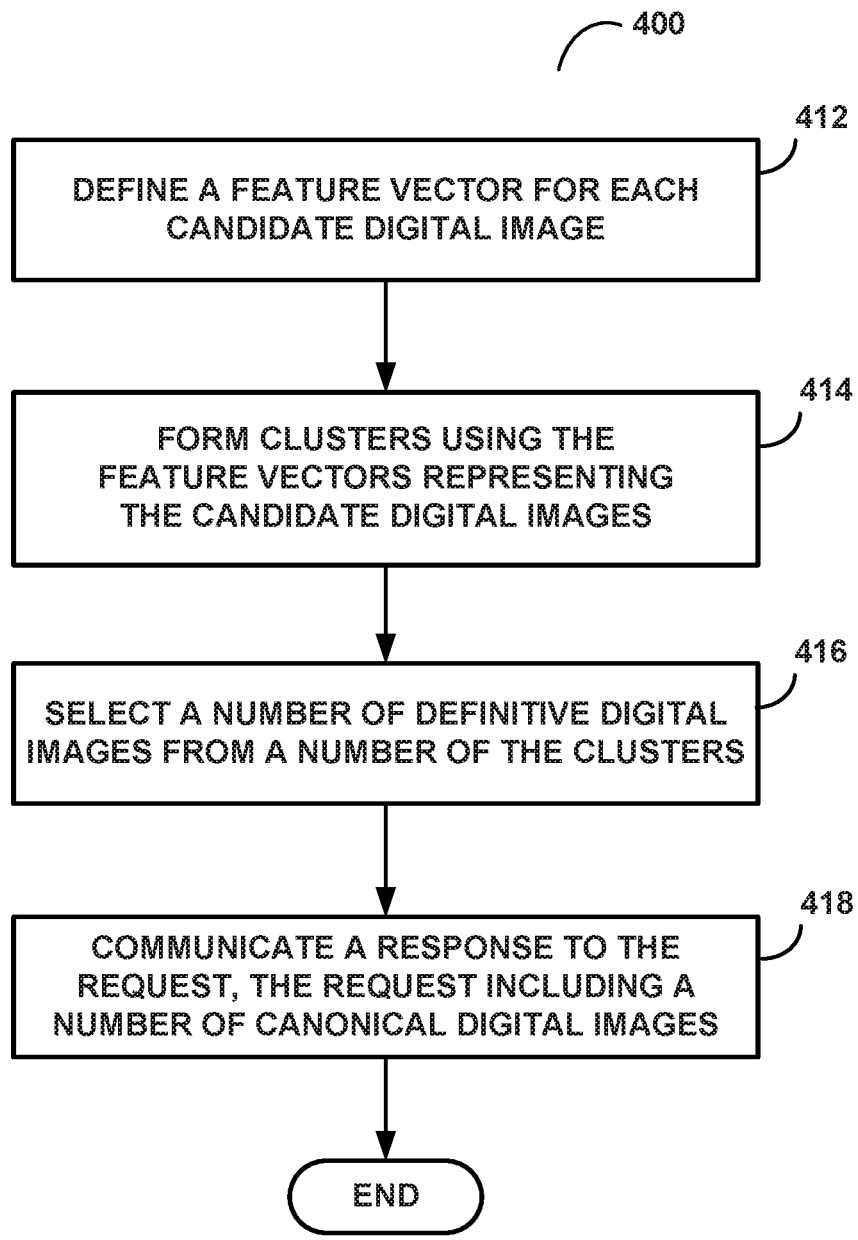
Figure 5:
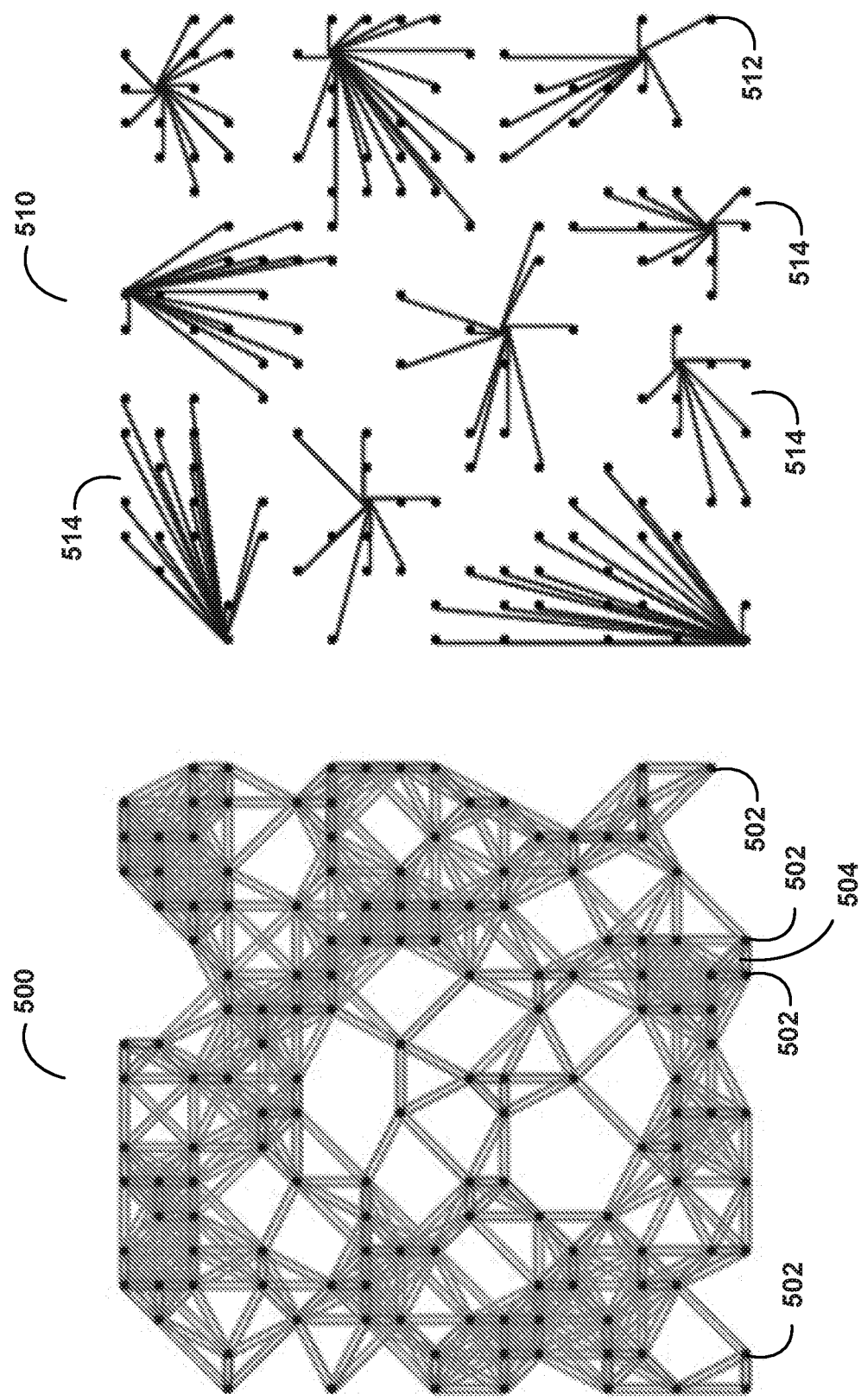
Figure 6:
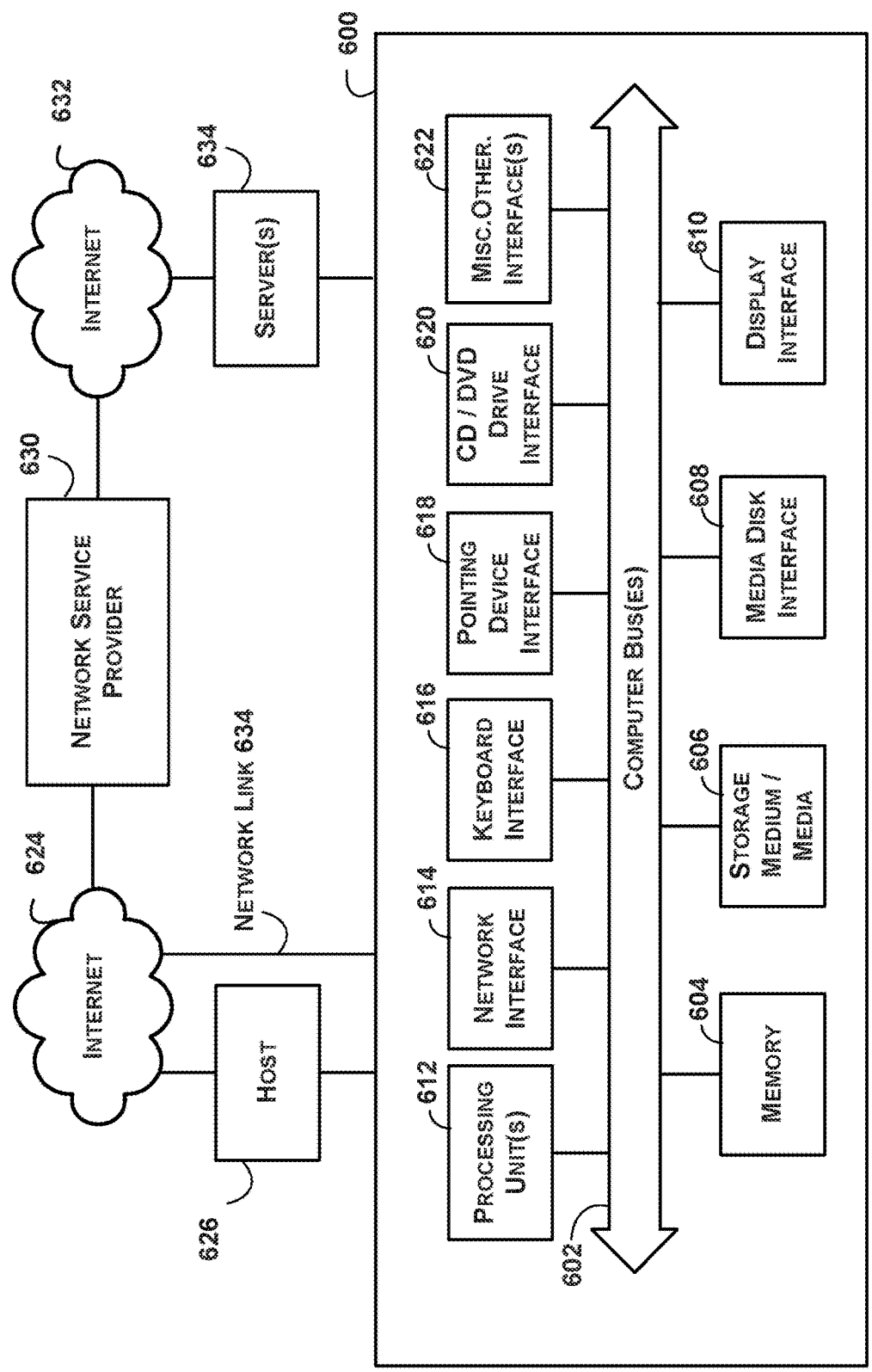

FIG. 4, which comprises FIGS. 4A and 4B, is a flowchart illustrating steps performed in accordance with some embodiments of the present disclosure;

FIG. 5 provides a pictorial illustration of an input graph and clusters from the input in accordance with one or more embodiments of the present disclosure; and FIG. 6 is a block diagram illustrating the architecture of an exemplary hardware device in accordance with one or more embodiments of the present disclosure.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games (such as fantasy sports leagues). The foregoing is provided to illustrate that claimed subject matter is intended to include a wide range of possible features or capabilities.

The detailed description provided herein is not intended as an extensive or detailed discussion of known concepts, and as such, details that are known generally to those of ordinary skill in the relevant art may have been omitted or may be handled in summary fashion.

The principles described herein may be embodied in many different forms. By way of background, digital images can be associated with information in a textual format, which is usually referred to as metadata. Metadata can be embedded in a digital image file, together with the image content, e.g., pixel data, or it can be contained in a separate file associated with the digital image file. Some metadata may be automatically generated and some metadata may be added, or edited, manually using a software application, such as client application and server application, for example. Some examples of the metadata associated with a digital image include without limitation image capture device information (e.g., make and model of device, geographic location in a case that the device includes a geographic positioning component such as a Global Positioning System (GPS) device), exposure information, and descriptive information. The descriptive information can include without limitation keywords or phrases about the content.

A search engine can use the term(s) of a search query to search the metadata associated with digital images in much the same way that it uses a search query to search a corpus of documents containing text. In such a case, the search engine can return a number of digital images whose metadata is determined to be relevant to the search query term(s). Such an approach fails to consider the digital content itself. For example, consider a search using the terms "Brad Pitt", the conventional search engine is likely to return a number of digital images of the actor; however, the user may have been searching for digital images of the boxer name Brad Pitt. Even if the user added the term "boxer" to the search query, the search results can still include images of the actor. In addition to a problem of disambiguation, such a conventional approach's focus on the metadata does not consider the quality of Brad Pitt's depiction in a given digital image. Consequently, a digital image whose metadata is textually relevant to a search query may be returned as a search result in place of another digital image that is more representative of Brad Pitt, and is of higher quality.

There are millions of digital images available on the web and more digital images are being added all the time. It is impossible for a human to attempt to review every digital image depicting an entity (e.g., person, point of interest, or other type of object) and select a number of digital images that are most representative of the entity. In fact and given the number of digital images that are currently available and the number of digital images that are being added, it is impossible for a computing system to use a supervised approach for selecting digital images most representative of an entity, since a supervised approach requires that each digital image included in a training data set for an entity have a tag, or other label, identifying the entity.

As such, the instant disclosure provides a novel solution addressing a need for selecting a diverse set of high quality, canonical (or most definitive, most representative, etc.) digital images for a given entity that is scalable to any size corpus of digital images. While the present disclosure is discussed using "person" as one example of a type of entity (indeed, celebrity queries can constitute a large part of the query volume in digital image searching), or type of object, embodiments of the present disclosure may be used to select canonical digital images for any type of object depicted in a digital image.

The present disclosure provides novel systems and methods for automatic selection of high quality, canonical digital images from a corpus of digital images. The novel systems and methods are well suited for any scale or size corpus, including a scale the size of the web, from which selection of high quality, canonical digital images for each of a number of entities can be selected. According to some embodiments, the disclosed systems and methods use an unsupervised approach that uses a combination of metadata and visual features without manual or human intervention, e.g., manual or human labeling of training data. Using visual features, diversity for the retrieved canonical digital images can be achieved across visual attributes and looks, such as age, hairstyles, etc.

According to some embodiments, the disclosed systems and methods first searches for digital images using a number of text-based searches and the metadata associated with the digital images in a corpus, selects a first set of candidate digital images comprising digital images returned from each search, e.g., selects a number, n, of the most relevant digital images in each search. The pixel data in each selected digital image (each candidate digital image) is analyzed. In one example, an area, or portion, of a candidate image corresponding to a depiction of an entity in the candidate digital image. A bounding box encompassing the entity can be used to define the area and pixels corresponding to the entity. In a case of a person entity, a face detection algorithm, such as Viola-Jones face detector, can be used to detect a face object and define a bounding box including the detected face object.

The Viola-Jones face detector is trained using labeled training data which comprises a number of digital images depicting faces (and labeled as such) and a number of digital images not depicting faces (and labeled as such). An object detector, such as the Viola-Jones face detector, can make use of a cascade of feature detectors, e.g., Haar feature-based cascade of classifiers, to detect a type of object, such as a face object, depicted in a digital image.

After a face is detected in a candidate digital image, fiducial points are detected on the face. Some examples of fiducial points are, without limitation, the corners of the eyes and mouth, centers of each eye and the mouth, tip of the nose, eyebrows, chin, or the like. A number of the detected fiducial points (e.g., 61 of 76 fiducial points detected using the Viola-Jones face detector) are selected to generate a feature vector using a number of pixel data regions including each selected fiducial point. While all of the fiducial points that are detected may be used, certain fiducial points that might be considered to be less important than other fiducial points might be discarded in order to reduce the size of the resulting feature vector. By way of a one non-limiting example, fiducial points located on the outer portion of a face might be considered to be less important than fiducial points involving the eyes, mouth, nose, eyebrows, or the like.

As is described in more detail below, a feature vector is created to represent each candidate digital image identified as being textually relevant to the entity, as determined using the search queries and associated metadata. The feature vectors associated with the candidate digital images are used to determine visual relevance to the entity. In at least one embodiment, a clustering mechanism, such as and without limitation Markov Cluster (MCL), or MCL algorithm, is used to form clusters, or groupings, of the feature vectors representing the candidate digital images.

The feature vector created for each candidate digital image represents visual cues of the candidate digital image which can be used in validating whether or not the candidate digital image is a canonical digital image of an entity. The visual cues represented by each candidate digital image's feature vector can be used in the validation process using an unsupervised clustering approach in accordance with one or more embodiments disclosed herein. In so doing, "noisy" images, e.g., images that depict the wrong entity or digital images without faces altogether, may be eliminated. Eliminating "noisy" digital image improves the relevance of digital images retrieved in response to a request for digital images of a given entity.

To further illustrate using MCL as an example, input to MCL includes a graph comprising a node for each candidate digital image and weighted edges connecting a node to each other node in the graph. Each node in the input graph can be represented by the corresponding candidate digital image's feature vector. A weight associated with an edge connecting two nodes represents the similarity between the two nodes as determined using the feature vectors of the two nodes. In one example, the similarity can be determined using a cosine-similarity of the two feature vectors. In accordance with at least one embodiment, a similarity that is less than a threshold similarity, e.g., less than a 0.4 threshold value, can be set to zero.

Output of the MCL algorithm is a set of clusters formed using the MCL algorithm and the input to the MCL algorithm, including the input graph and feature vectors of the candidate digital images. The clusters can be analyzed to filter out outlier clusters, e.g., clusters with less than a threshold number of candidate digital images, so that some number of the output clusters considered to be the larger clusters remain. A number of candidate digital images are selected from each cluster, or alternatively from the larger clusters. As is described in more detail below, within a given one of the larger clusters, a number of groups of candidate digital images is formed. Within each group, candidate digital images are ranked based on quality and at least one top-ranked (from the quality-based ranking) candidate digital image is selected as a canonical digital image from the group. As is discussed in more detail below, a score (a "canonicalness" score) can be determined based on at least one consideration (or criterion) of quality, such as entity proportion relative to other parts of the candidate digital image, entity location within the candidate digital image, and image aesthetics.

Canonical digital image selection is performed for each group within each cluster. In so doing, a diverse set of definitive, or canonical, images for the entity is determined. The set of canonical digital images can be associated with a number of terms, e.g., the terms used in selecting the candidate digital images. The set of terms associated with a set of canonical digital images can be used in identifying the set of canonical digital images in response to a search including one or more terms form the set of associated terms. As one non-limiting, the canonical digital images can be retrieved and distributed over the web using a search engine, such as Yahoo!® Image Search, an online photo sharing system, such as Flickr®, an online social networking system, or the like.

Some of the benefits of the disclosed systems and methods can be evidenced two-fold: 1) the disclosed systems and methods provide a technologically based mechanism for automatic selection of quality canonical digital images of an entity; and (2) the disclosed systems and methods improve the efficiency and accuracy of existing digital image retrieval and distribution technological systems by automatically selecting (from a corpus of digital images including low quality and less-representative depictions of an entity) a number of the highest quality, most representative digital images of an entity.

The disclosed systems and methods can be implemented for any type of content item, including, but not limited to, video, audio, images, text, and/or any other type of multimedia content. While the discussion herein will focus on still digital image content items, it should not be construed as limiting, as any type of content or multimedia content, whether known or to be known, can be utilized without departing from the scope of the instant disclosure. By way of an example, digital video content can comprise a number of frames, each of which can be considered to be a digital image comprising a number of pixels represented as binary data.

Figure 1:
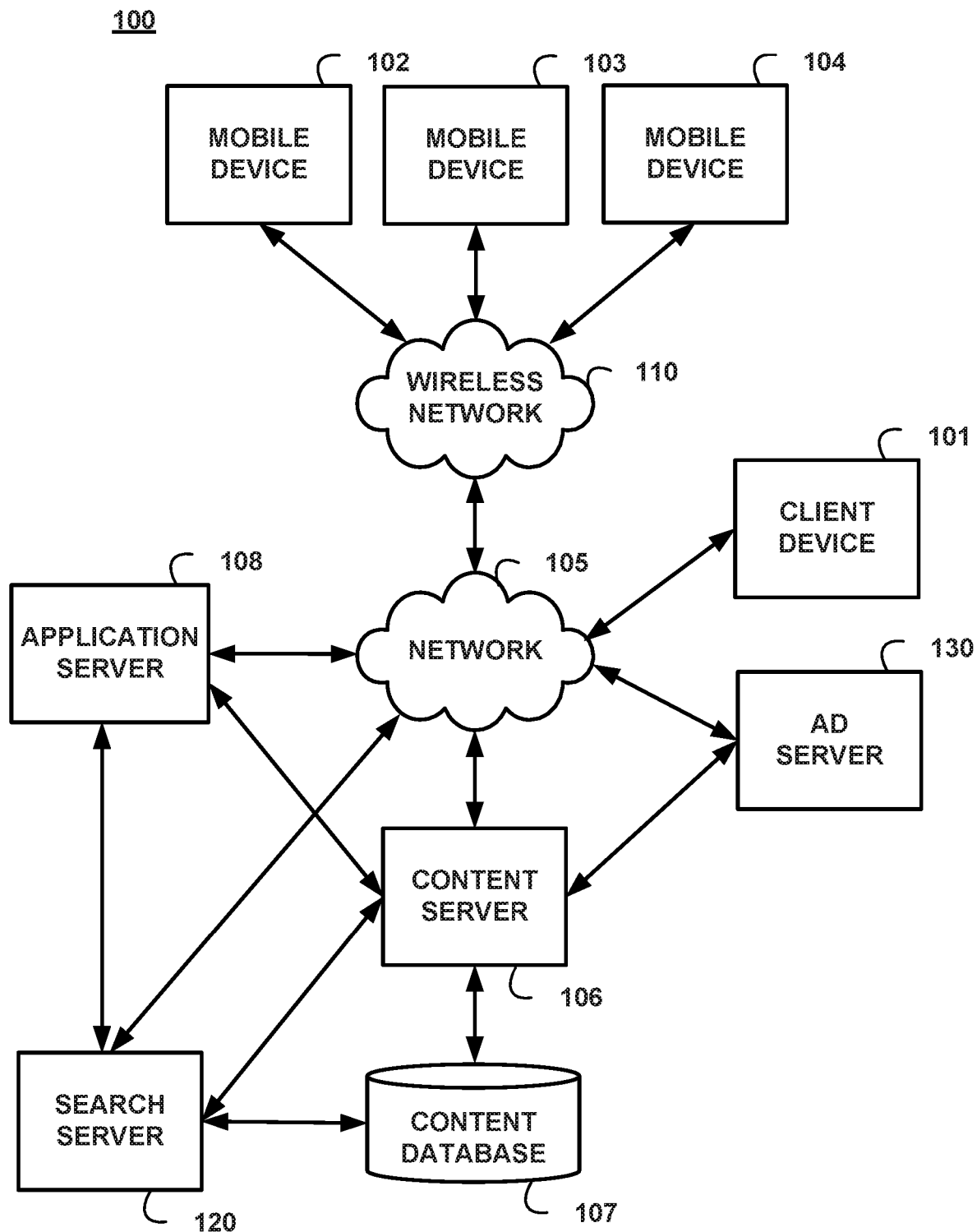
FIG. 1 is a schematic diagram illustrating an example of a network within which the systems and methods disclosed herein could be implemented according to some embodiments of the present disclosure.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, search server 120 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as acquaintances, friends, family, colleagues, or co-workers, coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as streaming media site/service (e.g., YouTube®), an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a video application and/or video platform, can be provided via the application server 108, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo! ®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a streaming video application (e.g., YouTube®, Netflix®, Hulu®, iTunes®, Amazon Prime®, HBO Go®, and the like), blog, photo storage/sharing application or social networking application (e.g., Flickr®, Tumblr®, and the like), can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 16, 18, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices.

Moreover, in one embodiment, servers 106, 108, 120 and/or 130 may be integrated into a single computing device, without departing from the scope of the present disclosure.

Figure 2:
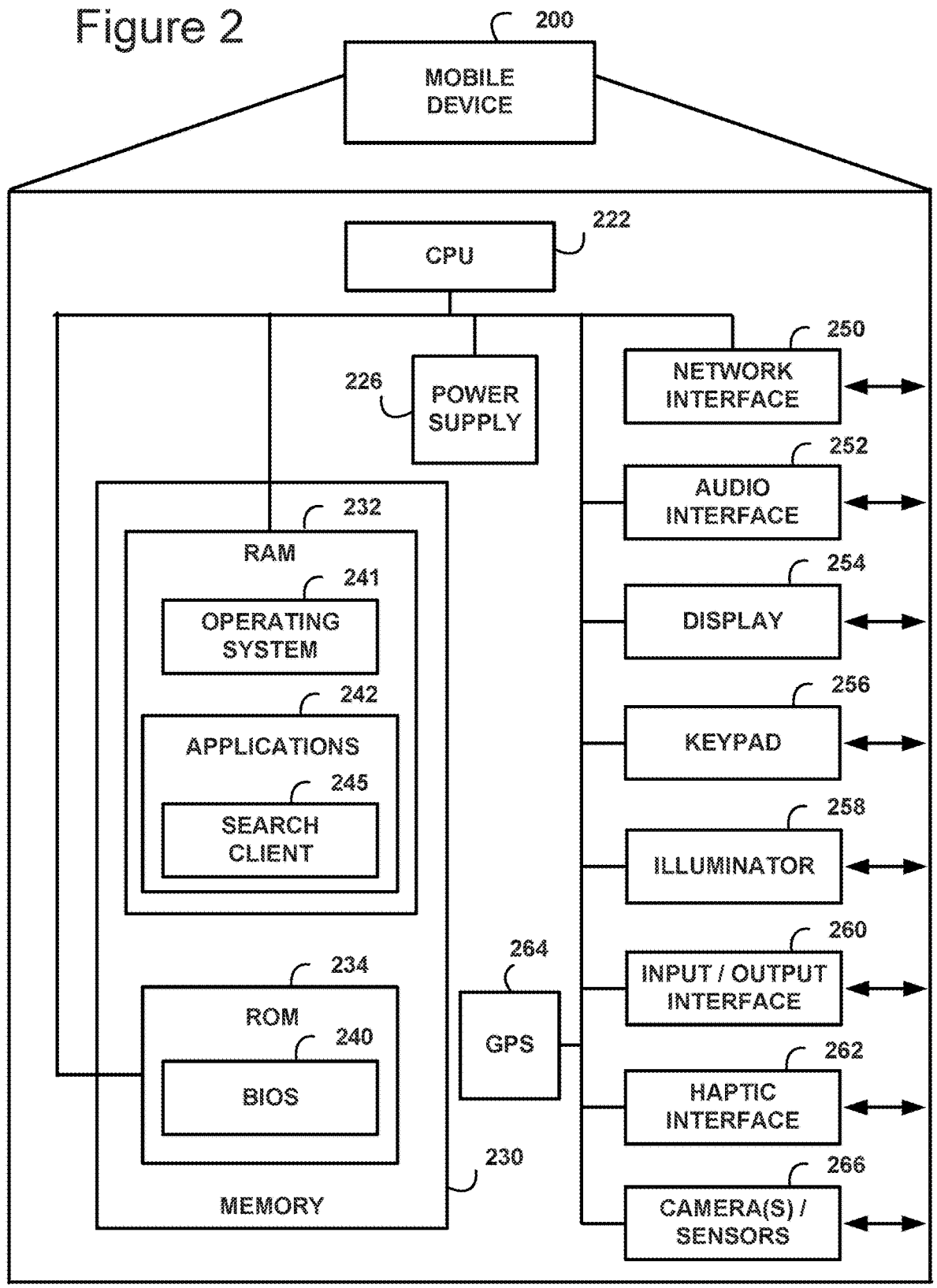
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the client device 200 receives a communication from another user.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by client device 200 to store, among other things, applications 242 and/or other data. For example, data stores may be employed to store information that describes various capabilities of client device 200. The information may then be provided to another device based on any of a variety of events, including being sent as part of a header during a communication, sent upon request, or the like. At least a portion of the capability information may also be stored on a disk drive or other storage medium (not shown) within client device 200.

Applications 242 may include computer executable instructions which, when executed by client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Having described the components of the general architecture employed within the disclosed systems and methods, the components' general operation with respect to the disclosed systems and methods will now be described below.

Figure 3:
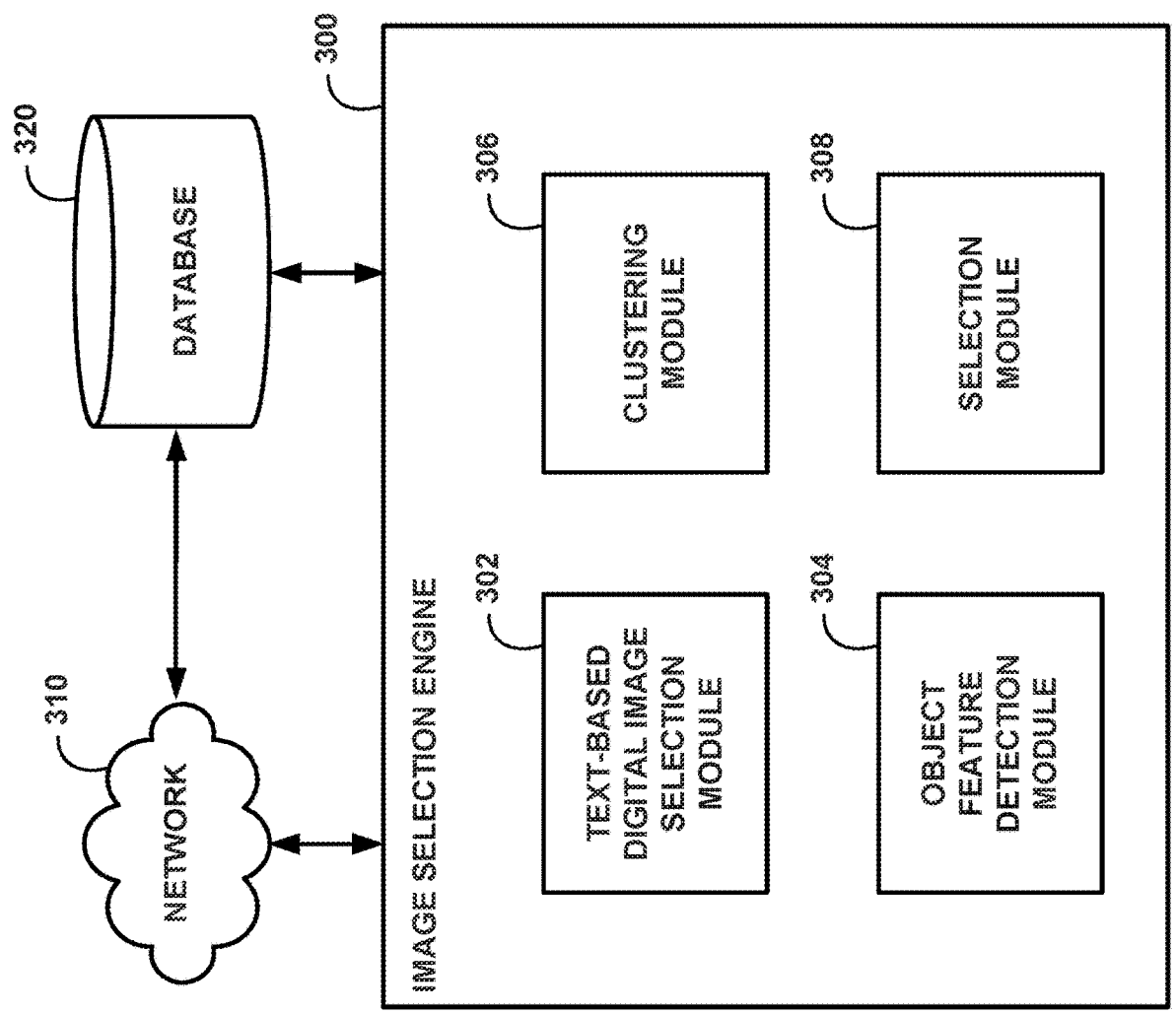
FIG. 3 is a schematic block diagram illustrating components of an exemplary system in accordance with embodiments of the present disclosure.

FIG. 3 is a block diagram illustrating the components for performing the systems and methods discussed herein. FIG. 1 includes a digital image selection engine 300, network 310 and database 320. The image selection engine 300 can be a special purpose machine or processor and could be hosted by an application server, content server, social networking server, web server, search server, content provider, email service provider, ad server, user's computing device, and the like, or any combination thereof.

According to some embodiments, image selection engine 300 can be embodied as a stand-alone application that executes on a user device. In some embodiments, the image selection engine 300 can function as an application installed on the user's device, and in some embodiments, such application can be a web-based application accessed by the user device over a network. In some embodiments, the image selection engine 300 can be installed as an augmenting script, program or application to another media application (e.g., Yahoo! ® Image Search, Flickr®, and the like).

The database 320 can be any type of database or memory, and can be associated with a content server on a network (such as and without limitation a content server, search server, application server, etc.,) or a user's device. Database 320 comprises a dataset of data and metadata associated with local and/or network information related to users, services, applications, content (e.g., video) and the like. Such information can be stored and indexed in the database 320 independently and/or as a linked or associated dataset. It should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include, for purposes creating, recommending, rendering and/or delivering GIFs or videos, user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store data and metadata associated with digital image content from an assortment of media providers. For example, the information can be related to, but not limited to, metadata such as that described herein and pixel data for each digital image content item. As discussed above, the metadata can be automatically generated by an image capture device and/or provided by the user using a client application and/or using a web-based application provided by a content/service provider (i.e., Yahoo!®, Flickr® or Tumblr®), a social networking provider or other third party services (e.g., Facebook®, Twitter® and the like), or some combination thereof.

According to some embodiments, each digital image (e.g., each candidate digital image) can be represented as an n-dimensional vector (or feature vector), and each such feature vector can be stored in database 320, together with an association relating a digital image to its feature vector. In addition, database 320 can store a mapping between a set of canonical digital images and a set of associated search terms. Database 320 may also store a "canonicalness" score associated with a canonical digital image.

While the discussion below will involve cluster analysis of digital images, as discussed above, the information can be analyzed, stored and indexed according to any known or to be known computational analysis technique or algorithm, such as, but not limited to, data mining, Bayesian network analysis, Hidden Markov models, artificial neural network analysis, logical model and/or tree analysis, and the like.

The network 310 can be any type of network such as, but not limited to, a wireless network, a local area network (LAN), wide area network (WAN), the Internet, or a combination thereof. The network 110 facilitates connectivity of the image selection engine 300, and the database of stored resources 320. Indeed, as illustrated in FIG. 1, the image selection engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as digital image engine 300, and includes text-based (digital image) selection module 302, object feature detection module 304, clustering module 306, and (canonical digital image) selection module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed with reference to FIG. 4.

As discussed in more detail below, the information processed by the image selection engine 300 can be supplied to the database 320 in order to ensure that the information housed in the database 320 is up-to-date as the disclosed systems and methods leverage real-time information and/or behavior associated with a digital image file, user and/or the user's device during or responsive to image selection and retrieval, as discussed in more detail below.

FIG. 4, which comprises FIGS. 4A and 4B, provides a process flow overview in accordance with one or more embodiments of the present disclosure. Process 400 of FIG. 4 details steps performed in accordance with exemplary embodiments of the present disclosure for automatically selecting a number of high quality, canonical digital images depicting, and representative of, each entity. According to some embodiments, as discussed herein with relation to FIG. 4, the process involves automatically selecting high quality, canonical digital images representative of, and depicting, an entity, or entities. Such selection involves selection of a set of candidate digital images based on textual relevance, detecting features of a given entity (or object) in each textually-relevant candidate digital image detection, clustering the candidate digital images to form a number of digital image groups, and selecting a number of the candidate digital images as high quality, canonical digital images for the given entity, as is described in more detail below.

In the example of FIG. 4, steps 404-408 can be executed in text-based digital image selection module 302, steps 410-412 can be executed in object feature detection module 304, step 414 can be executed in clustering module 306 and step 416 can be executed in selection module 308.

At step 402, an entity for which a number of high quality, canonical digital images is to be determined is received by image selection engine 300. In one example, the image selection engine 300 may operate in an online mode, and a request for retrieval of a set of digital images for an entity might be received from a user or from an image search and retrieval system in response to a request received by the image search and retrieval system from a user. In another example, image selection engine 300 may operate in an offline mode, and process a number of entities, each with associated search terms, and identify, for each entity, a number of high quality, canonical digital images.

In any case, each entity has a number of search terms associated with the entity. The search terms may be received as part of a request. Alternatively, the search terms can be derived from information about the entity. In one example, the entity has some initial information, such as a name, descriptive title, unique identifier from a reference source, such as and without limitation Wikipedia® (e.g., a Wikipedia® ID), etc. This initial information may be used to expand the initial information to form a number of queries at step 504. Each query includes a number of attributes of the entity for disambiguation purposes. In the example discussed above, the attribute "boxer" can be included with "Brad Pitt" in a search query for the boxer person entity, or alternatively the attribute "actor" can be included with "Brad Pitt" in a search query for the actor person entity. Other attributes may be included, such as and without limitation "young", "Oscars", etc. for Brad Pitt the actor, for example.

At step 406, each query is submitted to a search engine to search at least one corpus of digital images. Each set of search results for a given query includes a number of result items, each result item identifying a corresponding digital image. In addition, each result item has an associated rank (relative to other result items in the same set of search results) and a relevancy score determined by the search engine. A result item's rank and relevancy score can be used as an indicator of the corresponding digital image's textual relevance to the search query (used to generate the set of search results) and to the entity.

Each set of search results and each result item's ranking and relevancy score in the set of search results are passed to step 408 to select a number of digital images (textually relevant to the entity) from each set of search results based on their respective ranking and relevance in the set of search results. More particularly and at step 408, for each set of search results, a number (e.g., 50) of the top-ranked (most relevant) digital images are selected and added to a set of candidate digital images that are processed in succeeding steps to select, using an unsupervised approach, a number of high quality, canonical (or definitive) digital images for the entity. In this process, a set of high quality, canonical digital images is determined, each of which is both textually and visually relevant to the entity and determined to be of higher quality than each of the unselected candidate digital images.

In the example given above in connection with step 408, the number of candidate digital images selected from a set of search results is given as 50. It should be apparent that any number of candidate digital images may be selected from each set of search results, and that the number of search results selected from each set of search results may vary from one set of search result to another.

The pixel data in each selected candidate digital image is analyzed. At step 410, each candidate digital image from the set of candidate digital images is analyzed to detect a type of object corresponding to the type of the entity in the candidate digital image. In one example in connection with a person entity, a number of face detectors can be used to "locate" a face object in the candidate digital image. Continuing the example using a person entity, one example of a face object detector is the Viola-Jones face detector which detects a number of fiducial points on a face. Another face detector, such as Active Shape Models With Stasm, may be used instead of, or in addition to, the Viola-Jones face detector. A different object detector, or object detectors, may be used for each different object, or entity, type. Any object detector now known or later developed can be used in connection with embodiments of the present disclosure.

An area, or areas, of a candidate digital image including the same type of object as the entity is identified using one or more object detectors. A bounding box encompassing the entity can be used to identify one area. An area's corresponding bounding box can be defined using the locations of the fiducial points. In one example, a rectangular-shaped bounding box can be defined by x and y coordinates of each corner of area in the candidate digital image. Each corner of the bounding box can correspond to a pixel (and its location) in the candidate digital image. The bounding box can be defined to encompass all, or a selected set of, fiducial points identified by an object detector. It should be apparent that any size or shape can be used as a "bounding box" for defining an area of a candidate digital image including a detected object.

As discussed above, an object detector, such as the Viola-Jones face detector, can identify a number of fiducial points of the object, e.g., fiducial points of a person entity's face in a candidate digital image. Some examples of fiducial points of a face object are, without limitation, the corners of the eyes and mouth, centers of each eye and the mouth, tip of the nose, eyebrows, chin, or the like. A number of the detected fiducial points (e.g., 61 of 76 fiducial points detected using the Viola-Jones face detector) are selected to generate a feature vector determined using the pixel data around each selected fiducial point. While all of the fiducial points that are detected may be used, certain fiducial points that might be considered to be less important than other fiducial points might be discarded in order to reduce the size of the resulting feature vector. By way of a one non-limiting example, fiducial points located on the outer portion of a face might be considered to be less important than fiducial points involving the eyes, mouth, nose, eyebrows, or the like.

At step 412, a feature vector is created to represent each candidate digital image. In generating the feature vector for a candidate digital image, descriptors are extracted around each fiducial point being considered. In one example, a region of pixels, such as a 16×16 square pixel region, is defined, and the pixel data within the region is processed to extract a number of feature descriptors. In one example, scale-invariant feature transform (SIFT) algorithm can be used to detect and define local features (or local feature descriptors) in the candidate digital image. Histogram of oriented gradient (HOG) algorithm is another example of a feature descriptor algorithm (and corresponding local feature descriptor) which can be used instead of, or in addition to SIFT. It should be apparent that any feature descriptor algorithm now known or later developed can be used to determine a feature using pixel data of a candidate digital image.

In at least one embodiment, a number of feature descriptors are identified at different scales, or sizes, of pixel regions. A 16×16 pixel region is one example of one pixel region scale, or size, which may be used. Other examples of pixel region scales, or sizes, for which a number of feature descriptors can be generated include 32×32 and 64×64. It should be apparent that any pixel region scale and any number of scales (or pixel region sizes) may be used. In accordance with one or more embodiments, three scales, e.g., 16×16, 32×32 and 64×64, are used for each fiducial point being considered (e.g., all or some subset of the fiducial points identified by an object detector), and the pixel data in each corresponding pixel region is processed using a number of feature descriptor extractors to generate a set of feature descriptors for each fiducial point being considered.

To further illustrate, assume that 61 fiducial points are being considered, and that three different pixel region scales and to two different feature extractors are used to extract features for each fiducial point. Using this scenario, each candidate digital image is represented by a feature vector comprising 366 features (or 61 fiducial points, each with two features extracted from each of three different scales, or sizes, of pixel regions).

The extracted features can be aggregated, e.g., concatenated, resulting in an aggregate feature vector representing the candidate digital image. In accordance with one or more embodiments, a dimensionality reducer, such as principal component analysis (PCA), can be used to reduce the size of the aggregate feature vector. In one example, a dimensionality reducer such as PCA can be used to reduce the size of the aggregate feature vector, or feature vector, to 5490. Of course, a feature vector representing a candidate digital image need not be reduced or it can be reduced to any desired size using PCA, or another dimensionality reducer.

At step 414, a clustering mechanism, such as and without limitation the MCL algorithm, is used to form clusters, or groupings, of the candidate digital images using the feature vectors representing the candidate digital images. To further illustrate using the MCL algorithm as an example, the input to the MCL algorithm is a graph comprising a node for each candidate digital image and weighted edges connecting each node to each other node in the graph.

FIG. 5 provides a pictorial illustration of an input graph and clusters from the input in accordance with one or more embodiments of the present disclosure. Example 500 is a pictorial illustration of a graph input to an MCL algorithm. As illustrated in example 500, the input graph includes a number of nodes (shown as black circles, some of which are labeled with reference number 502 for purposes of illustration) and edges (shown as lines, some of which are labeled using the reference number 504 for purposes of illustration) between two nodes. Each node in the input graph can be represented by the corresponding candidate digital image's feature vector. A weight associated with an edge connecting two nodes represents the similarity between the two nodes as determined using the feature vectors determined for the two candidate digital images corresponding to the two nodes. In one example, the similarity can be determined using a cosine-similarity function and the two feature vectors determined for the two candidate digital images. In accordance with at least one embodiment, a similarity that is less than a threshold similarity, e.g., less than a 0.4 threshold value, can be set to zero. Output of the MCL algorithm is a set of clusters formed using the input to the MCL algorithm. A number of clusters are pictorially shown in example 510; some of the clusters are labeled with the reference number 514 for purposes of illustration. In example 510, each cluster comprises a number of nodes 512, each of which corresponds to a candidate digital image.

At step 416 of FIG. 4, a number of canonical digital images is selected from each of a number of the clusters identified at step 412. A canonical digital image that is selected is determined (relative to other candidate digital images considered and not selected) to be definitive, or most representative, of the entity and to be of high quality using functionality described herein. In accordance with at least one embodiment, the clusters can be analyzed to filter out outlier clusters, e.g., clusters with less than a threshold number of candidate digital images, so that some number of the output clusters considered to be the larger clusters remain. A number of candidate digital images are selected from each of the larger clusters.

Within a given one of the larger clusters, a number of candidate digital image groups are formed. The candidate digital images within a given cluster can be grouped according to similarity, which can be defined by a similarity score determined using a cosine-similarity algorithm and the feature vector associated with each candidate digital image. In one example, similar candidate digital images are used to form a group of candidate digital images.

In one example of a formation of a group of candidate digital images within a cluster, a first candidate digital image in the cluster can be selected and a similarity score can be determined in connection with the first candidate digital image and each other candidate digital image (or second candidate digital image) in the cluster. In this example, the feature vectors corresponding to the first candidate digital image and a second candidate digital image can be input to a cosine-similarity algorithm to determine a similarity score for the pair of candidate digital images. In this example, a threshold similarity score, e.g., threshold similarity score of 0.8, can be used to select any second candidate digital images that are sufficiently similar (e.g., have a similarity score that is greater than 0.8) to the first candidate digital image. The selected second candidate digital images and the first candidate digital image can form a group of similar candidate digital images within a cluster.

Within each group, a "canonicalness" (or quality) score is determined for each candidate digital image. The score determined for a candidate digital image is a function of at least one consideration of quality of each candidate digital image. Within a group, the candidate digital images belonging to the group are ranked based on each candidate digital image's canonicalness score relative to the score of each other candidate digital image in the group. At least one top-ranked candidate digital image can be selected as a high quality, canonical digital image from each group.

In accordance with at least one embodiment, a "canonicalness" score can be determined based on at least one consideration of quality, such as entity proportion relative to other parts of the candidate digital image, entity location within the candidate digital image, and image aesthetics.

In one example in which the entity's proportion (or percentage) is determined relative to the candidate digital image, the bounding box encompassing the entity's depiction in the candidate digital image can be used to identify the number (or count) of the pixels corresponding to the object (the entity) found in candidate digital image relative to a total number of pixels in the candidate digital image. The proportion of pixels corresponding to the detected entity can be compared to a threshold proportion (or percentage) to determine whether or not the entity's proportion is sufficient, and an entity proportion score can be based on the determined proportion. In one example, the entity proportion score can be the determined proportion (or percentage).

Another example of a condition of quality of a candidate digital image that may be used involves a location of the entity's depiction in the candidate digital image. In this example, the bounding box can be used as an indicator of the location of the entity in the candidate digital image. In one example, the condition of quality based on location can be a larger value in a case that the bounding box is closer to the center of the candidate digital image and smaller value in a case that the bounding box is farther from the center (e.g., toward a side, toward the bottom, etc.).

Another example of a condition of quality of a candidate digital image that may be used involves a determination, using a text object detector, whether or not the candidate digital image depicts text. If so, the candidate digital image can be assigned a lower (relative to other candidate digital images in which text is not detected) score for this quality measure, or the candidate digital image can be eliminated from consideration altogether.

Another example of a condition of quality of a candidate digital image that may be used involves a determination whether or not the candidate digital image is a natural image, e.g., an image taken by a camera or other digital image capturing device, as opposed to a sketch or a cartoon. A neural network-based classifier may be used that is pre-trained using features of both natural as well as other images, which feature for a given training image may include a label indicating whether the candidate digital image is a natural image or other than a natural image, e.g., a sketch, cartoon, etc. By way of one non-limiting example, a Flickr® classifier can be used to process the candidate digital image to determine whether or not it is a natural image. A candidate digital image that is determined to be a natural image is scored higher for this quality measure than a candidate digital image that is determined to not be a natural image.

Another example of a condition of quality of a candidate digital image that may be used involves the aesthetics of a candidate digital image. A classifier, such as a support vector machine, may be used to determine a measure, or score, of the aesthetic quality of the candidate digital image. In one example, the classifier can be used to determine whether or not the candidate digital image contains offensive content.

Where more than one quality condition is used, the quality scores determined for each of the multiple quality conditions may be aggregated, e.g., summed, summed and then averaged, etc. Each quality score may have an associated weighting, so that one quality condition's score might be weighted, or considered, more heavily, or less heavily, in determining the aggregate quality score. The quality score, which can include, for example, one or more scores determined for one or more of the quality conditions discussed above, can be used as the candidate digital image's "canonicalness" score.

As discussed above, canonical digital image selection is performed for each grouping within each cluster, at step 416. In so doing, a diverse set of canonical digital images for the entity can be determined. The set of canonical digital images can be associated (e.g., in database 320) with a number of terms, e.g., the terms used in selecting the candidate digital images. The set of terms associated with a set of canonical digital images can be used in identifying the set of canonical digital images in response to a search including one or more terms form the set of associated terms. Each canonical digital image can also be associated with its canonicalness score (e.g., in database 320), and the canonical score associated with each canonical digital image for an entity can be used in ordering, or ranking, the canonical digital images in a presentation of the digital images for an entity, for example.

At step 418, the canonical digital images associated with the entity identified in step 402 can be retrieved and distributed. In one example, an entity's canonical digital image, or images, can be retrieved and distributed over the web via a search engine, such as Yahoo! ® Image Search, an online photo sharing system, such as Flickr®, an online social networking system, or the like. In one example, the search engine, online phone sharing system, etc. can access database 320 to retrieve a set of canonical digital images for an entity using one or more search terms associated with the entity and the canonical digital images in the set. The canonicalness score associated with each canonical digital image can be used in selecting a subset of the canonical digital images associated with an entity, e.g., selecting the top, n, scoring canonical digital images for a given entity.

In one example, embodiments of the present disclosure can be used to power a "celebrity timeline" feature of a web service, such as Fastbreak®, which timeline can be communicated to a client computing device and displayed using a display of a client computing device. The timeline can display a number of canonical digital images of a person, e.g., a celebrity, at various ages, or age ranges. The automated selection process, which uses an unsupervised approach in selecting canonical digital images, can be used in place of a manual editorial process, which would not be able to consider the large number of available images for one entity, let alone the large number of entity, e.g., people, points of interest, etc., that may be the basis of a request received by such an online service.

Steps 404-416 may be performed for a large number of entities and for any size corpus of digital images. Steps 404-416 can be repeated as frequently as desired to select a fresh set of canonical digital images based on recency, so that the digital images recently added to a corpus are considered in determining a set of canonical digital images for each of a number of entities.

As shown in FIG. 6, internal architecture 600 of a computing device(s), computing system, computing platform, user devices, set-top box, smart TV and the like includes one or more processing units, processors, or processing cores, (also referred to herein as CPUs) 612, which interface with at least one computer bus 602. Also interfacing with computer bus 602 are computer-readable medium, or media, 606, network interface 614, memory 604, e.g., random access memory (RAM), run-time transient memory, read only memory (ROM), media disk drive interface 620 as an interface for a drive that can read and/or write to media including removable media such as floppy, CD-ROM, DVD, media, display interface 610 as interface for a monitor or other display device, keyboard interface 616 as interface for a keyboard, pointing device interface 618 as an interface for a mouse or other pointing device, and miscellaneous other interfaces not shown individually, such as parallel and serial port interfaces and a universal serial bus (USB) interface.

Memory 604 interfaces with computer bus 602 so as to provide information stored in memory 604 to CPU 612 during execution of software programs such as an operating system, application programs, device drivers, and software modules that comprise program code, and/or computer executable process steps, incorporating functionality described herein, e.g., one or more of process flows described herein. CPU 612 first loads computer executable process steps from storage, e.g., memory 604, computer readable storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

Persistent storage, e.g., medium/media 606, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 628 typically provides information communication using transmission media through one or more networks to other devices that use or process the information. For example, network link 628 may provide a connection through local network 624 to a host computer 626 or to equipment operated by a Network or Internet Service Provider (ISP) 630. ISP equipment in turn provides data communication services through the public, worldwide packet-switching communication network of networks now commonly referred to as the Internet 632.

A computer called a server host 634 connected to the Internet 632 hosts a process that provides a service in response to information received over the Internet 632. For example, server host 634 hosts a process that provides information representing video data for presentation at display 610. It is contemplated that the components of system 600 can be deployed in various configurations within other computer systems, e.g., host and server.

At least some embodiments of the present disclosure are related to the use of computer system 600 for implementing some or all of the techniques described herein. According to one embodiment, those techniques are performed by computer system 600 in response to processing unit 612 executing one or more sequences of one or more processor instructions contained in memory 604. Such instructions, also called computer instructions, software and program code, may be read into memory 604 from another computer-readable medium 606 such as storage device or network link. Execution of the sequences of instructions contained in memory 604 causes processing unit 612 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 600. Computer system 600 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 602 as it is received, or may be stored in memory 604 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

The invention claimed is:

1. A method comprising:
obtaining, via a computing device, a plurality of candidate digital images associated with an object, the object corresponding to an object type, a number of fiducial points being associated with the object type;
analyzing, via the computing device, each candidate digital image of the plurality, the analyzing comprising detecting the object and the number of fiducial points in the candidate digital image;
determining, via the computing device, an n-dimensional feature vector for a candidate digital image of the plurality using pixel data corresponding to the number of fiducial points detected in the candidate digital image, the feature vector determination being performed for each candidate digital image of the plurality to determine a plurality of feature vectors;
forming, via the computing device, a plurality of clusters using the plurality of feature vectors, each cluster of the plurality having a number of candidate digital images assigned to it using the feature vector determined for each candidate digital image of the number;
determining, via the computing device and for a cluster of the plurality of clusters, a canonical score for each candidate digital image assigned to the cluster;
selecting, via the computing device and for the cluster of the plurality of clusters, a set of canonical digital images from the number of candidate digital images assigned to the cluster; and
maintaining, via the computing device and in a data store, an association between a canonical digital image of the set, the canonical score determined for the canonical digital image and a set of search terms, the set of search terms being associated with the object, the maintaining being performed for each canonical digital image of the set such that each canonical digital image, of the set, has an associated canonical score and the associated set of search terms.

2. The method of claim 1, further comprising:
receiving, via the computing device, a search request for digital images depicting the object, the search request comprising at least one search term from the set of search terms associated with each canonical digital image of the set; and
generating, via the computing device, a set of search results in response to the search request, the generating comprising determining that the at least one search term belongs to the set of search terms and selecting at least one canonical digital image from the set of canonical digital images associated with the set of search terms, the selecting using the associated canonical score for each canonical digital image of the set.

3. The method of claim 2, the associated canonical score for each canonical digital image, of the set, is used to select a subset of the canonical digital images of the set for inclusion in the set of search results.

4. The method of claim 2, generating the set of search results further comprising:
using the associated canonical score of each canonical digital image selected for inclusion in the set of search results in ranking each selected canonical digital image in the set of search results.

5. The method of claim 1, the canonical score determined for a candidate digital image, assigned to the cluster, is a measure of quality of the candidate digital image.

6. The method of claim 5, the measure of quality is determined based on a combination of measures, the measures comprising a first measure that is based on a determined proportion of the candidate digital image depicting the object, a second measure that is based on aesthetics of the candidate digital image and a third measure that is determined based on a location of the object in the candidate digital image.

7. The method of claim 6, the first measure being determined based on a proportion of the pixels corresponding to the object detected in the candidate digital image relative to a total number of pixels of the candidate digital image.

8. The method of claim 6, the third measure being determined based on the location of the object relative to a center location in the candidate digital image and the highest value assignable to the third measure is associated with the center location of the candidate digital image.

9. The method of claim 6, the measure of quality that is determined based on the combination is a sum of the first, second and third measures.

10. The method of claim 6, the measure of quality that is determined based on the combination is an average of the first, second and third measures.

11. The method of claim 1, the selecting the set of canonical digital images from the number of candidate digital images assigned to the cluster comprising using the canonical score determined for each candidate digital image associated to the cluster to select a number of highest scoring candidate digital images for the set of canonical digital images.

12. The method of claim 1, the set of search terms, associated with the object and associated with each canonical digital image depicting the object, being used in obtaining the plurality of candidate digital images.

13. A non-transitory computer-readable storage medium tangibly encoded with computer-executable instructions that when executed by a processor associated with a computing device perform a method comprising:
  obtaining a plurality of candidate digital images associated with an object, the object corresponding to an object type, a number of fiducial points being associated with the object type;
  analyzing each candidate digital image of the plurality, the analyzing comprising detecting the object and the number of fiducial points in the candidate digital image;
  determining an n-dimensional feature vector for a candidate digital image of the plurality using pixel data corresponding to the number of fiducial points detected in the candidate digital image, the feature vector determination being performed for each candidate digital image of the plurality to determine a plurality of feature vectors;
  forming a plurality of clusters using the plurality of feature vectors, each cluster of the plurality having a number of candidate digital images assigned to it using the feature vector determined for each candidate digital image of the number;
  determining, for a cluster of the plurality of clusters, a canonical score for each candidate digital image assigned to the cluster;
  selecting, for the cluster of the plurality of clusters, a set of canonical digital images from the number of candidate digital images assigned to the cluster; and
  maintaining, in a data store, an association between a canonical digital image of the set, the canonical score determined for the canonical digital image and a set of search terms, the set of search terms being associated with the object, the maintaining being performed for each canonical digital image of the set such that each canonical digital image, of the set, has an associated canonical score and the associated set of search terms.

14. The non-transitory computer-readable storage medium of claim 13, the method further comprising:
  receiving a search request for digital images depicting the object, the search request comprising at least one search term from the set of search terms associated with each canonical digital image of the set; and
  generating a set of search results in response to the search request, the generating comprising determining that the at least one search term belongs to the set of search terms and selecting at least one canonical digital image from the set of canonical digital images associated with the set of search terms, the selecting using the associated canonical score for each canonical digital image of the set.

15. The non-transitory computer-readable storage medium of claim 14, the associated canonical score for each canonical digital image, of the set, is used to select a subset of the canonical digital images of the set for inclusion in the set of search results.

16. The non-transitory computer-readable storage medium of claim 14, generating the set of search results further comprising:
  using the associated canonical score of each canonical digital image selected for inclusion in the set of search results in ranking each selected canonical digital image in the set of search results.

17. The non-transitory computer-readable storage medium of claim 13, the canonical score determined for a candidate digital image, assigned to the cluster, is a measure of quality of the candidate digital image.

18. The non-transitory computer-readable storage medium of claim 17, the measure of quality is determined based on a combination of measures, the measures comprising a first measure that is based on a determined proportion of the candidate digital image depicting the object, a second measure that is based on aesthetics of the candidate digital image and a third measure that is determined based on a location of the object in the candidate digital image.

19. The transitory computer-readable storage medium of 33, the set of search terms, associated with the object and associated with each canonical digital image depicting the object, being used in obtaining the plurality of candidate digital images.

20. A computing device comprising:
  a processor;
  a non-transitory storage medium for tangibly storing thereon program logic for execution by the processor, the program logic comprising:
    obtaining logic executed by the processor for obtaining a plurality of candidate digital images associated with an object, the object corresponding to an object type, a number of fiducial points being associated with the object type;
    analyzing logic executed by the processor for analyzing each candidate digital image of the plurality, the analyzing comprising detecting the object and the number of fiducial points in the candidate digital image;
    determining logic executed by the processor for determining an n-dimensional feature vector for a candidate digital image of the plurality using pixel data corresponding to the number of fiducial points detected in the candidate digital image, the feature vector determination being performed for each candidate digital image of the plurality to determine a plurality of feature vectors;

forming logic executed by the processor for forming a plurality of clusters using the plurality of feature vectors, each cluster of the plurality having a number of candidate digital images assigned to it using the feature vector determined for each candidate digital image of the number;

determining logic executed by the processor for determining, for a cluster of the plurality of clusters, a canonical score for each candidate digital image assigned to the cluster;

selecting logic executed by the processor for selecting, for the cluster of the plurality of clusters, a set of canonical digital images from the number of candidate digital images assigned to the cluster; and maintaining logic executed by the processor for maintaining, in a data store, an association between a canonical digital image of the set, the canonical score determined for the canonical digital image and a set of search terms, the set of search terms being associated with the object, the maintaining being performed for each canonical digital image of the set such that each canonical digital image, of the set, has an associated canonical score and the associated set of search terms.

* * * * *